United States Patent [19]

Patton

[11] E Re. 29,100

[45] Reissued Jan. 4, 1977

[54] SELECTIVE HYDROPEROXIDATION OF POLYOLEFINS IN AN AQUEOUS SLURRY

[75] Inventor: Tad L. Patton, Baytown, Tex.

[73] Assignee: Exxon Research & Engineering Co., Linden, N.J.

[22] Filed: Sept. 2, 1975

[21] Appl. No.: 609,284

Related U.S. Patent Documents

Reissue of:

[64] Patent No.: 3,870,692
Issued: Mar. 11, 1975
Appl. No.: 161,819
Filed: July 12, 1971

U.S. Applications:

[63] Continuation-in-part of Ser. No. 633,789, April 26, 1967, abandoned.

[52] U.S. Cl. ..... 526/22; 526/58; 526/351

[51] Int. Cl.[2] ..... C08F 110/06; C08F 8/06

[58] Field of Search ..... 260/93.7, 94.9 GC; 450/624

[56] References Cited

UNITED STATES PATENTS

| | | | |
|---|---|---|---|
| 2,911,398 | 11/1959 | Vandenberg | 260/93.5 |
| 3,069,382 | 12/1962 | Nikolov et al. | 260/877 |
| 3,284,541 | 11/1966 | Stanton et al. | 260/878 |
| 3,322,711 | 5/1967 | Bush et al. | 260/29.6 |
| 3,458,597 | 7/1969 | Jabloner | 260/877 |

*Primary Examiner*—William F. Hamrock
*Attorney, Agent, or Firm*—David A. Roth

[57] ABSTRACT

Polyolefins are selectively hydroperoxidized in an aqueous slurry with an ozone-oxygen mixture at temperatures between 65° and 100° C for a time which does not exceed one hour to introduce sufficient hydroperoxides for later graft copolymerization while minimizing formations of higher oxidation products of the polymer and limiting molecular weight degradation.

14 Claims, 1 Drawing Figure

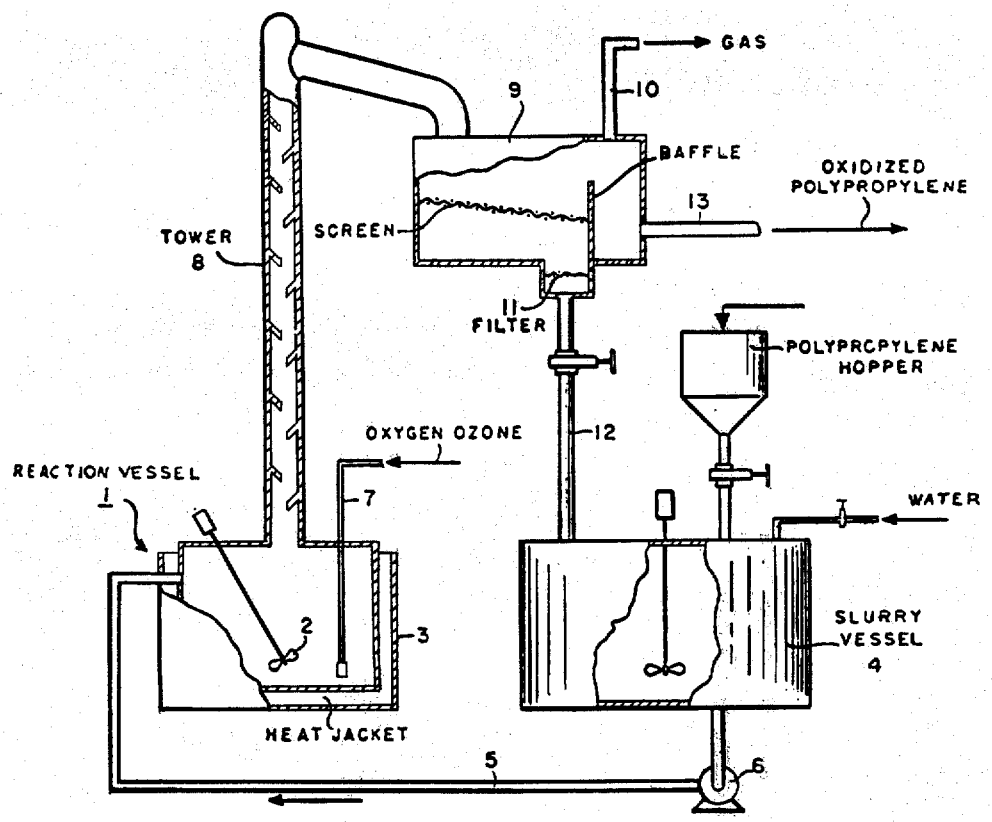
GAS
9
10
BAFFLE
OXIDIZED
POLYPROPYLENE
13
TOWER
8
SCREEN
11
FILTER
POLYPROPYLENE
HOPPER
OXYGEN OZONE
12
REACTION VESSEL
1
7
WATER
2
3
SLURRY
VESSEL
4
HEAT JACKET
5
6

SELECTIVE HYDROPEROXIDATION OF POLYOLEFINS IN AN AQUEOUS SLURRY

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of Ser. No. 633,789 filed Apr. 16, 1967, now abandoned, and entitled "Oxidation of Polyolefins for Graft Copolymerization." The parent application was abandoned on Aug. 26, 1971.

BACKGROUND OF THE INVENTION

Polyolefin fibers are much to be desired, since they are more resistant to rot and mildew than are natural fibers. The polyolefins, per se, are not dyeable, however, since they contain no dye sites. One suggestion, graft copolymerization with a material which does contain dye sites, requires a treatment of the polyolefin to allow such graft polymerization. Hydroperoxidation is an excellent example of such treatment.

Previous attempts to oxidize polyolefins, however, so as to introduce hydroperoxides for graft copolymerization, have been accompanied by the overoxidation of the polyolefins accompanied by extensive lowering of the molecular weight (polymer degradation). Heretofore, the use of oxygen alone or radiation in the presence of oxygen to introduce hydroperoxide groups onto the polyolefin have been attempted, as has the use of oxygen and ozone in non-aqueous treating zones. In order to introduce sufficient hydroperoxide groups on the total mass of polyolefin being oxidized, the processes are carried out under conditions which result in the formation of peroxides, ketones, aldehydes, acids, etc., which cause destructive degradation of the resulting graft copolymer during formation of the fibers at extrusion temperatures. Thus, the very purpose of the oxidation (to produce useful, dyeable fibers) is frustrated.

SUMMARY OF THE INVENTION

The present invention is directed to a process for selectively hydroperoxidizing a polyolefin preparatory to production of a graft copolymer which may be extruded, shaped or formed as a fiber without destructive degradation of the polyolefin and the loss of the desired physical properties of the polymer. The process of the present invention may be fully continuous and after the graft copolymerization has been carried out requires substantially no further treatment of the graft copolymer before being formed into a useful product.

The present invention may be briefly described as a process for oxidizing polyolefins in preparation for grafting thereto a monomer which polymerizes by the free-radical mechanism. The ultimate product is a graft copolymer which may be formed into a useful product, such as a fiber, while retaining the desirable physical properties of the polyolefin. In order to accomplish this objective, certain critical process variables must be employed. More specifically, the process of the present invention involves the oxidation of the polyolefin with an ozone-oxygen mixture at temperatures between 65° and 100° C. whereby a sufficient concentration of hydroperoxides are introduced into the polymer without substantial overoxidation and degradation thereof.

It has been found that polyolefins may be oxidized with an ozone-oxygen mixture while in a water slurry. According to the present invention, the oxidation of polyolefins, especially polypropylene, if carried out at temperatures between 65° and 100° C., provides a specificity towards hydroperoxides which is not obtained at lower temperatures. Hydroperoxide concentrations betwee 0.014 and 0.025 weight percent, which are sufficient for producing a suitable graft copolymer, age easily attainable. The temperature employed enables the selective hydroperoxidation to be carried out in the least possible time while retaining the desired physical characteristics of the polyolefin, whereas oxidation carried out at lower temperatures and for longer periods of time is accompanied by substantial overoxidation and degradation of the polymer. The amount of reacted ozone required to produce any given concentration of hydroperoxides has been found to be greater at lower temperatures (below 65° C.); this results in polymer degradation and in the formation of larger quantities of oxygen functional groups other than hydroperoxides. These oxygen functional groups, even after graft copolymerization has been carried out, remain in sufficient concentration so that the graft copolymer cannot be extruded into a useful product.

The polyolefins which may be selectively oxidized in accordance with the present invention are polymers of alpha-olefins having 2 to 8 carbon atoms in the molecule and are exemplified by polyethylene, polypropylene, polybutene-1, ethylene-propylene copolymers, ethylene-butene-1 copolymers, propylene-butene-1 copolymers, ethylene-pentene-1 copolymers and the like, having molecular weights from about 10,000 to about 1 million or more. The polymers may be made in a number of different ways. The polymers may be prepared by polymerization of the corresponding olefin or olefins employing a Ziegler-type catalyst. The preparation of the alpha-olefin homopolymers or copolymers which is treated according to the present invention are known and their preparation is not a part of this invention.

The oxidation of the polyolefin is carried out according to the present invention by forming a slurry of the polyolefin preferably in the form of a powder in water, and passing a stream of an ozone-oxygen mixture through the slurry. The polyolefin is preferably in the form of a powder having particles with the range from about 30 to about 1,000 microns, preferably 100–600 microns. The polyolefin will be in the slurry in amounts from about 0.5 to about 5 lbs. of polyolefin per gallon of water, preferably about 2 to 3 gal. The ozone-oxygen mixture may be formed by passing air or pure oxygen through an ozone generator to form a mixture having a concentration of ozone of between 10 and 115 milligrams of ozone per liter. The preferred concentration would be as much ozone as may be economically produced and introduced into the mixture; concentrations of about 50 to 90 mg of ozone per liter have been found suitable. The ozone/air mixture is contacted with the polyolefin at a rate from 18 mg $O_3$/lb. of polymer/minute to 225 mg/lb/min. Preferably, the rate will be about 25 to 55 mg/lb/min. The slurry of polyolefin may contain a wetting agent such as a known detergent to maintain a uniform slurry. The slurry is well mixed. It has been found according to the present invention that the oxidation may be carried out in a very short period of time if temperatures between 65° and 100° C are used. Preferred temperatures are between 75° and 95° C. The entire oxidation should take no longer than about one hour. In large scale batch operations, the oxidation may be carried out in a time between 20 and 45 minutes and preferably less than 30 minutes. Where a continuous oxidation operation is used or the amount of polyolefin oxidized is relatively small, the time required may be between about 5 to 15 minutes. This decreased exposure time to the ozone-oxygen mixture in the oxidation of the polyolefin results in a graft having physical properties substantially better than when greater time is used in the oxidation step.

In a continuous oxidation the density of the polyolefins, especially of polypropylene is used as an aid to maintain the time of oxidation relatively short. The polyolefin slurry is introduced into a well-mixed reaction vessel wherein the oxygen-ozone mixture is added and the entire slurry is allowed to rise gradually with the oxygen-ozone mixture through a tower. After the oxidized polymer has passed through the tower, it is recovered in a receiving vessel while the water and entrained oxygen-ozone mixture may be recycled. The size of the reaction vessel and tower or a column of suitable dimensions may be chosen depending on the amount of polyolefin to be oxidized. The extent of oxidation may then be controlled by the rate of flow of the polymer suspension through to the reaction vessel and column or tower, the concentration of ozone in the oxygen-ozone mixture, the height of the tower or column and the particular reaction temperature at which the oxidation is carried out.

After the oxidation of the polyolefin, it is necessary to remove any unreacted ozone or ozone and oxygen mixture from the slurry before the addition of the polar monomer which is to be grafted to the oxidized polyolefin. The presence of ozone and/or oxygen will result in the formation of substantial amounts of homopolymer and oxidation of the polar monomer which is to be grafted. The separation of the unreacted ozone together with any oxygen from the oxidized polyolefin may be accomplished in a number of ways. The dissolved gases may be flashed from the water slurry by adjustment of the pressure or by passing a stream of an inert gas such as a nitrogen through the slurry, thereby flushing the dissolved gases. Another way of separating the unreacted ozone is by filtering the slurry obtained in the oxidation step and repeatedly washing the oxidized polyolefin with fresh water.

After the separation of the unreacted ozone and/or oxygen from the oxidized polyolefin, the addition of the polar monomer may be accomplished in at least two ways. The oxidized polyolefin may be suspended in a water slurry. The slurry of the oxidized polyolefin is maintained in an inert atmosphere such as being blanketed with nitrogen, argon or the like. The oxidized polyolefin is maintained in the slurry by mixing and, if preferred, a wetting agent may be used. To the slurry is added a polar monomer which polymerizes by free-radical mechanism. Suitable polar monomers are 2-vinylpyridine, 4-vinyl-pyridine, the other substituted vinyl pyridines, acrylic acid and its esters and amides, methacrylic acid and its esters and amides, acrylonitrile, methacrylonitrile, methyl vinyl ketone, methyl isopropenyl ketone, vinyl esters of aliphatic acids, vinyl esters of sulfonic acids, styrene, p-methoxy styrene, β-furyethylene, vinylidene esters of aliphatic acids, N-vinylpyrrolidone, divinyl benzene, vinyl trialkoxy silanes, butadiene, isoprene, piperylene, and the like. Thus, suitable polar monomers are those which are liquids under the grafting conditions used and may be added by a water slurry. An alternative technique for adding the polar monomer except when the polar monomer is completely water soluble is to filter the slurry of polar monomer and oxidized polyolefin so as to remove the excess polar monomer which is in the water and not contacting the oxidized polyolefin and which would merely homopolymerize when heated. Since most polar monomers which polymerize by free-radical mechanisms are not completely miscible in water, the polar monomer having a greater affinity to the oxidized polyolefin than to water adheres to the oxidized polyolefin. When the filtering technique is used, the water and polar monomer may be recycled.

According to the present invention the grafting step is carried out by maintaining the temperature of oxidized polyolefin and polar monomer at about 45° C. to about 125° C. and at suitable pressures to maintain the water slurry, if a water slurry is used. The entire grafting step may be accomplished in any suitable time, such as 1 to 48 hours. As an example, the temperature may be maintained between 60° and 90° C. for 2 to 4 hours. It is preferred that the temperature and time be kept at a minimum in the grafting step to minimize the homopolymerization of the polar monomer. The graft polymerization of the polar monomer is increased at higher temperatures, but at the higher temperatures there is also an increased formation of homopolymer of the polar monomer. Accordingly, temperature and time are maintained in a balance to obtain the desired graft copolymer. The conditions for grafting according to the present invention are flexible and may be varied so as to obtain a graft copolymer having from 1 to 25% of the polar monomer. It is to be understood that the number of sites at which graft copolymerization may occur depends on the concentration of hydroperoxides which are obtained in the selective oxidation step. Thus by the process of the present invention, the percentage of polar monomer in the graft copolymer can be maintained and controlled in a reproducible manner.

BRIEF DESCRIPTION OF THE DRAWING

The drawing discloses a schematic view of an apparatus for the continuous oxidation of polyolefins according to the present invention.

DESCRIPTION OF THE PREFERRED EMBODIMENT

Referring to the drawing, the polyolefin is oxidized in a reaction vessel 1. The vessel has a stirrer 2 and is provided with heat exchange means 3 such as a water bath or the vessel may be provided with a steam jacket or the like. A water slurry of the polyolefin, preferably polypropylene, is prepared in slurry vessel 4 and is pumped through line 5 by pump 6 into the reaction vessel 1. To the reaction vessel 1 is added a stream of an oxygen-ozone mixture by line 7. The water slurry is well agitated by the stirrer 2 and as additional slurry of the polypropylene is added to the reaction vessel the oxidized polypropylene flows up tower 8. The reaction vessel 1 may be merely the bottom portion of tower 8 or it may be an enlarged vessel at the bottom of tower 8 depending on the size of the total oxidation device. The flow of the polypropylene slurry into reaction vessel 1 gradually raises the level of the reaction mixture through the tower 8. Due to the low density of the polymer, the polypropylene will flow upward through the tower into a receiving vessel 9. The entrained gas mixture passes out of outlet 10 while the water and dissolved oxygen and ozone may be passed through a filter 11 in the slurry vessel 9 and through line 12 back to the slurry vessel 4. The oxidized polypropylene is removed from slurry vessel 9 through line 13. By specific design of tower 8 and controlling the rate of flow of the polypropylene slurry to the reactor vessel 1 by pump 6, the extent of oxidation may be closely controlled at a given ozone concentration and temperature of oxidation. By the continuous oxidation device, it has been found that a relatively short residence time something less than 30 minutes and preferably between about 5 to 15 minutes enables a very economical continuous oxidation apparatus to be utilized even on relatively large amounts of polyolefin.

The present invention will be further illustrated by the following specific examples which are given by way of illustration and not as limitations on the scope of the invention. In the examples, the hydroperoxide content is measured by the titration procedure described by E. Beati, F. Severini and G. Clerici in Volume 61 of Makromoleculare Chemie (1963) at pages 104 ff.

EXAMPLE 1

A slurry was formed with 600 grams of polypropylene powder (having particles within the range from 100 to 600 microns in 1,800 milliliters of water. A stream of ozone and oxygen containing 92 mg of ozone per liter was bubbled through the stirred slurry at a rate of 0.5 liters per minute at a temperature of 80° C. until 2.5 liters had passed through the slurry. A total of 230 mg of ozone was absorbed (38 mg $O_3$/100 g polymer) with a resulting hydroperoxide concentration of 0.0145 weight per cent. The slurry was then flushed with nitrogen to remove unreacted ozone and oxygen. The oxidized polypropylene was then added 41 g of freshly distilled 2-vinylpyridine to form a slurry in 1,000 milliliters of water. The slurry was stirred under a nitrogen atmosphere at a temperature of 100° C. for 3 hours. The resulting graft copolymer was cooled on a filter and extracted continuously with hot methanol to remove homopolyvinylpyridine. The final graft copolymer contained 2.92 per cent 2-vinylpyridine. To the graft copolymer was added a commercially available phenolic stabilizer (Ionox 330) and the polymer was successfully spun, drawn at a ratio of 4:1 and knitted. The copolymer required no treatment of any kind to make it suitable for spinning.

EXAMPLE 2

Following the same procedure as in Example 1,650 grams of polypropylene in the form of fine pellets (about 1–2 millimeters in diameter) was slurried in 1,800 milliliters of water. The stream of ozone and oxygen had a concentration of 88 mg $O_3$ per liter and was added until 5 liters had been passed through the slurry. A total of 382 mg of ozone was reacted (60 mg $O_3$/100 g polymer) and a hydroperoxide concentration of 0.0047 weight per cent. The oxidation was carried out at 80° to 82° C. The grafting after removal of ozone and oxygen was carried out after 41 g of 2-vinylpyridine at 100° C. for 3 hours. After removal of the homopolyvinylpyridine 1.2 per cent 2-vinylpyridine was found in the graft copolymer. Again the graft copolymer was successfully spun, drawn at a ratio of 4:1 and knitted into socks which could be dyed. The fibers had excellent physical properties.

EXAMPLE 3

A suspension was formed with 200 grams of polypropylene (Melt Flow-5.3) and 600 milliliters of water and 6 drops of Sterox AJ (an anionic surfactant). A stream of ozone and oxygen containing 82 mg of ozone per liter was bubbled through the stirred suspension at a rate of 0.5 liters per minute at room temperature (about 25° C.) until a total volume of 5 liters had passed through the suspension. The suspension was then flushed with nitrogen to remove unreacted oxygen and ozone. The foregoing was repeated twice more and the oxidized polymer (600 g.) combined. At this point, the hydroperoxide content was 0.022 wt. %. To the suspension of combined oxidized polypropylene was then added 90 g of freshly distilled 2-vinylpyridine. The suspension was stirred under a nitrogen atmosphere at a temperature at 75° C. for 3 hours. The polymer was cooled on a filter and extracted continuously with hot methanol to remove homopolyvinylpyridine. The final product contained 0.22 per cent nitrogen and was 93.4 per cent insoluble in boiling normal heptane. The Melt Flow of the graft copolymer was 6.1. The polymer was stabilized with 1.2 g. of a commercial phenolic stabilizer (Ionox 330) per 600 g of graft copolymer. The graft copolymer could not be spun, due to considerable melt fracture under extrusion conditions.

The only significant difference between Example 1 and Example 3 is the temperature and time in the oxidation of the polypropylene. A high temperature (80° C.) and shorter time (5 minutes) was used in Example 1 as compared to Example 3 wherein room temperature (25° C.) and ten minutes was used. In Example 3, more oxygen functional groups other than hydroperoxides were incorporated into the polymer, such that even though a greater amount of vinylpyridine was used in the grafting step the resultant graft copolymer still contained enough oxygen functional groups to prevent successful spinning of the product.

The significance of time and temperature at which the oxidation is carried out is illustrated in the following data wherein the amount of hydroperoxides formed and the amount of degradation which occurs, measured in terms of intrinsic viscosity (I. V.) is compared with time and temperature. In the following tables, two different ranges of ozone concentration are illustrated. In Table 1, the concentration is within the range of about 77 to 83 mg of ozone per liter introduced at a rate of 0.5 liters per minute.

Table 1

| | 77–83 mg $O_3$/liter in oxidizing gas | | | |
|---|---|---|---|---|
| Time (Minutes) | $O_3$Reacted (mg/100 g) | T., ° C. | ROOH Wt. % | Intrinsic Viscosity |
| 4 | 101 | 25 | 0.014 | 2.60 |
| 4 | 115 | 45 | 0.014 | 2.56 |
| 8 | 198 | 25 | 0.019 | 2.10 |
| 8 | 236 | 45 | 0.022 | 2.14 |
| 8 | 272 | 65 | 0.034 | 2.01 |
| 8 | 271 | 78 | 0.045 | 2.17 |
| 8 | 236 | 94 | 0.044 | 2.12 |
| 16 | 395 | 25 | 0.027 | 1.54 |
| 16 | 458 | 45 | 0.041 | 1.58 |

In Table 2, concentration is about 6.5 milligrams of ozone per liter introduced at the same rate of 0.5 liters per minute.

Table 2

| Time (Minutes) | 65 mg $O_3$/liter in oxidizing gas: $O_3$ Reacted (mg/100 g) | T., ° C. | ROOH Wt. % | Intrinsic Viscosity |
|---|---|---|---|---|
| 4 | 78 | 25 | 0.012 | 2.83 |
| 4 | 98 | 45 | 0.018 | 2.66 |
| 8 | 158 | 25 | 0.018 | 2.33 |
| 8 | 196 | 45 | 0.028 | 2.14 |
| 16 | 313 | 25 | 0.025 | 1.85 |
| 16 | 384 | 45 | 0.034 | 1.49 |

From the foregoing data it is significant that, for equivalent $O_3$ reacted, higher concentrations of hydroperoxides are formed at the higher temperatures (i.e., above 65° C.). The hydroperoxide is the first of the oxygen functional groups to occur in the oxidation sequence, whereas as further oxidation takes place peroxides, alcohols, ketones, and ozonides will also be formed. It is believed that these functional groups lead to degradation during spinning of graft copolymers which have been oxidized at the lower temperatures.

From Table 1, the data at constant time (8 minutes) is startling. It illustrates the unexpected specificity of the hydroperoxidation at the critical temperatures of the present invention. These datas are recast below in Table 3.

Table 3

| Line | Time Min. | Temp. ° C. | $O_3$ Reacted mg/100 g | ROOH wt. % |
|---|---|---|---|---|
| 1 | 8 | 25 | 198 | 0.019 |
| 2 | 8 | 45 | 236 | 0.022 |
| 3 | 8 | 65 | 272 | 0.034 |
| 4 | 8 | 78 | 271 | 0.045 |
| 5 | 8 | 94 | 236 | 0.044 |

Note that in lines 3 and 4, the amount of ozone reacted is substantially the same (272 v. 271), but the hydroperoxide formation is greater at the higher temperature (78° C. v. 65° C.) in line 4. Also note that in line 5 at 94° C., substantially the same amount of hydroperoxide formation (0.044 v. 0.045) was obtained as in line 4, although less ozone (236 v. 271) was reacted. Also compare line 5 with line 2, to note that at the same level of reacted ozone (236) the reaction carried out at 94° C. twice as much ROOH as was produced at 45° C. The above data clearly show that, directionally, the higher temperatures increase the formation of the desired hydroperoxide at the expense of the other (undesirable) oxygen compounds, and that particularly within the preferred range of 75° C. to 95° C., the formation of hydroperoxides is optimized. It is this shift in selectivity which provides the basis for the present invention.

To further illustrate the significance of the higher temperature, a comparison based on approximately equal weight percents of hydroperoxides formed at the same ozone concentration (78 to 83 mg of ozone per liter) is shown in Table 4. The intrinsic viscosity of the starting polymer was 4.35 and the rate of addition was 0.5 liters per minute.

Table 4

| ROOH Wt. Percent | Time (Minutes) | $O_3$ Reacted (mg/100 g) | T.,° C. | I. V. |
|---|---|---|---|---|
| 0.041 | 16 | 458 | 45 | 1.58 |
| 0.045 | 8 | 271 | 78 | 2.17 |
| 0.044 | 8 | 236 | 94 | 2.12 |

From the data in Table 4, it is significant that, due to lower reaction rates, it required twice the time at 45° C. to obtain the approximate same weight per cent hydroperoxides as it did at temperatures of 78° and 94° C. Note the large amount of ozone required to be reacted at the lower temperature to obtain the given hydroperoxide level. As the temperature is increased from 78° to 94° C. there is a relative decrease in the amount of reacted ozone required to obtain a given ROOH level. Thus, when less ozone is reacted, the amount of oxygen functional groups other than hydroperoxides is minimized.

To carry out the desired oxidation on large volumes of polyolefin such as polypropylene and still maintain the short period of time, a continuous operation was carried out. The following example illustrates the continuous oxidation.

EXAMPLE 4

Into a 2 liter round-bottom 3 necked flask equipped with a stirrer was introduced 300 grams of polypropylene powder 100 to 500 microns) suspended in 1 liter of water. The suspension was forced from the 2 liter flask into a second 500 ml round-bottom 3 necked flask by nitrogen pressure. The second flask was also equipped with a stirrer. To the flask was attached a 12 inch Vigreaux column. An oxygen-ozone stream was introduced to the second flask wherein a stream containing 95 milligrams of ozone per liter was pumped at a rate of 1 liter per 3 minutes. The second flask was also in a water bath such that the temperature of the reactants was maintained at between 70° and 80° C. As the polypropylene slurry was introduced from the first flask to the reaction flask, the polypropylene powder slowly rose through the Vigreaux column into a recovery flask. The 300 grams of polypropylene in the slurry was pumped through the reactor vessel in a time of about 18 minutes with a resulting hydroperoxide concentration of 0.021 weight per cent.

From the foregoing, it is shown that sufficient hydroperoxides are formed in a continuous operation such that grafting and spinning may be carried out on the continuously oxidized polymer.

EXAMPLE 5

Unstabilized polypropylene powder was suspended in water in a Morton flask. Pure oxygen was bubbled through the vigorously stirred suspension at a rate of about 0.5 liter per minute for periods of 20–55 minutes at two temperatures (25° and 45° C). The polymer was then collected on a filter and washed with water and then with acetone. The polymer was dried at 60° C. in a vacuum oven. The results are summarized below.

| No. | ° C | Vol. $O_2$ (liters) | Minutes | Wt. % ROOH | Intrinsic Viscosity |
|---|---|---|---|---|---|
| A[a] | 25 | 0 | 20 | 0 | 4.07 |
| B | 25 | 10 | 23½ | 0 | 4.10 |
| C | 25 | 20 | 38¼ | 0 | 4.09 |
| D | 46 | 10 | 19½ | 0 | 4.13 |

-continued

| No. | °C | Vol. $O_2$ (liters) | Minutes | Wt. % ROOH | Intrinsic Viscosity |
|---|---|---|---|---|---|
| E | 43–45 | 30 | 55½ | 0 | 4.09 |
| F[b] | — | — | — | 0 | 4.08 |

[a]Polypropylene powder stirred in water but no oxygen passed through the suspension.
[b]Polypropylene powder (untreated).

It can be concluded that no hydroperoxidation and no changes in intrinsic viscosity occurred when the polymer was exposed to oxygen under the above described reaction conditions for periods up to 55 minutes at 45° C. Compare these results obtained when using mixtures of ozone in oxygen to oxidize polypropylene under comparable conditions, where measurable concentrations of hydroperoxide and significant decreases in intrinsic viscosity occurred even after periods of time as short as 2 minutes. This example illustrates that oxygen alone is ineffective, even through a water slurry is employed during treatment.

The nature and objects of the present invention having been completely described and illustrated, what I wish to claim as new and useful and secure by Letters Patent is:

1. A process for selective hydroperoxidation of finely divided solid polypropylene particles, which consists essentially of:

contacting a cationic surfactant-free, slurry of said polypropylene, having a particle size of about 30 to 1,000 microns in water with a 50 to 90 mg. of ozone per liter of air mixture as the sole free radical initiator, at a temperature within the range of from 75° C. to 95° C., and for a time sufficient to obtain a hydroperoxide concentration in said polypropylene between 0.014 and 0.050 weight percent, whereby formation of higher oxidation products than hydroperoxides is significantly less than said formation at temperatures outside said 75° C. to 95° C. range.

2. A process in accordance with claim 1 wherein said polypropylene has a molecular weight of at least 10,000.

3. A process in accordance with claim 1 wherein the ozone treat rate is from 18 to 225 mg $O_3$/lb of polymer/min.

4. A process in accordance with claim 1 wherein the polyolefin is polypropylene powder having a particle size within the range from 100 to 600 microns.

5. A process in accordance with claim 1 wherein the ozone treat rate is from 25 to 55 mg $O_3$/lb of polymer/min.

6. A process in accordance with claim 1 wherein the temperature is from 78° to 94° C., the time of oxidation is from 8 minutes, the amount of ozone reacted is about 236 to 271 mg/100 g polymer, and the ROOH concentration in the polymer is about 0.044 to 0.045 wt. %.

7. A process according to claim 1 wherein the time of said contacting is 16 minutes or less.

*8. A process for selective hydroperoxidation of finely divided solid polypropylene particles, which consists essentially of:*

*contacting a cationic surfactant-free, slurry of said polypropylene, having a particle size of about 30 to 1000 microns in water with a 50 to 90 mg. of ozone per liter of an ozone-oxygen mixture as the sole free radical initiator, at a temperature within the range of from 75° C. to 95° C.,*

*and for a time sufficient to obtain a hydroperoxide concentration in said polypropylene between 0.014 and 0.050 weight percent,*

*whereby formation of higher oxidation products than hydroperoxides is significantly less than said formation at temperatures outside said 75° C. to 95° C. range.*

*9. A process in accordance with claim 8 wherein said polypropylene has a molecular weight of at least 10,000.*

*10. A process in accordance with claim 8 wherein the oxygen treat rate is from 18 to 225 mg $O_3$/lb of polymer/min.*

*11. A process in accordance with claim 8 wherein said polypropylene particles have a particle size within the range from 100 to 600 microns.*

*12. A process in accordance with claim 8 wherein the ozone treat rate is from 25 to 55 mg $O_3$/lb of polymer/min.*

*13. A process in accordance with claim 8 wherein the temperature is from 78° to 94° C., the time of oxidation is about 8 minutes, the amount of ozone-reacted is about 236 to 271 mg/100 g polymer, and the ROOH concentration in the polymer is about 0.044 to 0.045 wt. %.*

*14. A process according to claim 8 wherein the time of said contacting is 16 minutes or less.*

* * * * *